INVENTORS.
STIG B. TIBBLING
DAVID L. GREENWOOD

ATTORNEY.

April 29, 1969   S. B. TIBBLING ET AL   3,440,936
PHOTOCOMPOSING MACHINE
Filed July 8, 1966   Sheet 6 of 6

INVENTORS.
STIG B. TIBBLING
DAVID L. GREENWOOD
BY Ray S Pyle
ATTORNEY.

United States Patent Office 3,440,936
Patented Apr. 29, 1969

3,440,936
PHOTOCOMPOSING MACHINE
Stig B. Tibbling, Hollywood, Fla., and David L. Greenwood, New York, N.Y., assignors to Varityper Corporation, Newark, N.J., and Wilmington, Del., a corporation of Delaware
Filed July 8, 1966, Ser. No. 563,900
Int. Cl. B41b 17/06
U.S. Cl. 95—4.5                                7 Claims

ABSTRACT OF THE DISCLOSURE

A photocomposing machine for exposing a photographic strip from a movable transparency font wherein the font carries edge notches proportional in depth to the spacing desired for the photographic strip advance in placement of the exposure from the font on the strip.

---

The photocomposing machine provides a lever system that will permit the operator to move the lever a full stroke, but the lever system has a drive train with a yieldable link spring and that portion of the train subsequent to the spring is arrested in its advance by contact of a part thereof in a notch of the font. Then, the portion of the train subsequent to the font is employed to create a drive to the photo strip. The primary drive is rotatable between two positions in order that the amount of advance may be single or double at the operators selection.

Background of the invention

Lithography makes possible the composition of a printed page by combining various types of art work on one sheet, and then producing a master reproduction of the composed sheet. If necessary, any unwanted lines and defects may be removed by altering the surface of the master itself before printing is begun.

Therefore, a photocomposing concept has been developed as described in United States Patent 2,742,830. According to this prior art patent, a transparent disc is provided with an arcuate path of opaque background having portions removed in the configuration desired, such as the alphabetical characters. The disc compares to a photographic negative and may be used in like manner to produce a contact print. In order to produce such contact print, a web of film or sensitized paper is caused to move through an exposure station. The disc is mounted on a pivot in order to be able to position a particular section of the arcuate character path over the exposure station. Light is then projected through the particular selected character and a latent image is developed in the web of sensitized material.

Accordingly, a line of print or other characters may be composed on a strip or web of sensitized material. Upon development to a readable form, this composition may be attached to a sheet in position for performing its particular portion of the makeup of the finished composition. Anything that can be placed on photographic film can be produced in the arcuate path of the disc and printed onto the strip.

The patent teaches the use of notches formed in the periphery of the disc to accommodate a control finger. The control finger is a stop member carried by the actuation drive device within a contact printing machine. The actuation device is used to advance a strip of photosensitive material and that advance movement is limited to the depth of the notches in which the control finger enters.

The location of the control fingers and the notches on the disc is related to the particular character located in the lighthouse position. Thus, the finger locates the disc accurately as well as receiving control limitation from the disc.

Prior to this invention, the photographic printing equipment for producing such strip from sensitized material has been highly automated for rapid and convenient composition. The strip of sensitized material is exposed and developed in one continuous operation. Such prior equipment is desirable for those installations wherein high production is required. However, it has been found that many organizations are able to use the composing machines, but desire a lower cost piece of equipment because of the considerably lower production required of the machine. Furthermore, it has been found desirable in some work to employ several composing machines for various uses, and to take the web of exposed material from the machine to another location for development. These and other found requirements, have inspired the production of the present invention, wherein a novel lever arrangement causes the various functions to operate in related manner without the need for electrical actuation apparatus other than to time the exposure and provide light for exposure.

Summary of the invention

The principal portion of this invention centers about the use of a shaft which drives a feed sprocket for sensitized paper or film passing through an exposure device. A unidirectional clutch is employed to hold the shaft to one direction of rotation. A ratchet type swinging arm is driven through an intermediate manually operated lever system to rotate the shaft. A second ratchet type swingable arm is driven from the same lever system, but operates through a multiplying gear system to drive the first swinging arm at twice the distance it would swing by direct drive. Hence, if the first arm is actuated, a first degree of shaft rotation and sprocket advance will be experienced. If the second arm is actuated, double the amount of rotation and advance is experienced.

A shifting system is employed in order to select which of the two arms will be contacted by the lever system for advancement, or whether either will be contacted.

Furthermore, the two swingable arms are mounted as a unit, and the mounting is pivotable between given limits in order that the actuating lever system will cause the actual degree of arm swing to be more or less in magnitude, according to the initial contact position. Thus, a normal pivotal position for advance is selected, but if the spacing of the printing taking place on the advancing film or paper is advantageously condensed in order to shorten the overall length, or the spacing increased to lengthen the overall spacing, in order to justify the copy, then the initial position can be shifted toward or away from the lever system in order that a given movement of a manual lever may cause a selectable amplitude of rotational movement of the shaft.

The lever system, which is controlled by the shifting system to drive one or the other of the two arms, when drive is intended, is provided by a unique swinging lever that is driven by means of a yieldable interconnection spring from a manual lever. The manual lever is caused to move through the same stroke each time it is employed, and will stretch the spring to pull the swinging lever along. The swinging lever is used to operate a slide system. The slide system, in turn, is employed to contact and drive the two swingable arms.

The swinging lever is journaled on a supporting shaft and may be shifted longitudinally along the shaft. Regular shaft and sprocket spacing is accomplished by shifting the swinging lever into contact with a slide which has a finger extending up to the top surface of the machine where it will move toward the central mandrel upon which the disc exposure device is mounted. The disc exposure device has a plurality of slots along the surface, one slot related to each letter or symbol to be printed. The slot is then cut to a depth which is related to the width of spacing required for that particular letter or symbol. Thus, as the swinging lever moves the slide which carries the finger, the finger will ultimately enter into the proper slot. If the slot is less than maximum depth, the movement will be stopped short according to the depth of the slot on the exposure device. Thus, the swinging arm system will be driven to the extent established by the disc according to the particular symbol being printed.

By sliding the swinging lever to a second slide member position, free of the restriction of the finger extending above the support surface, another slide may be actuated to drive the selected one of the swingable arms, through the shifting system. The amount of swing in the second position is controlled by a cam set in the path of the lever. This cam is employed to determine the amount of space that is desired between letters, and is set by a dial manually operable from the face of the machine, according to the font size. Thus, the swinging lever has two positions of swinging operation, one of which is controlled by a slide which contacts the removable font disc and the other by an interference cam placed in its path according to the spacing desired between the letters. In each case, the developed translation of movement from the manual lever is controlled through the shifting system to drive either of the two swingable arms for advancing the sensitized material.

*Description of the invention*

Figure 1:
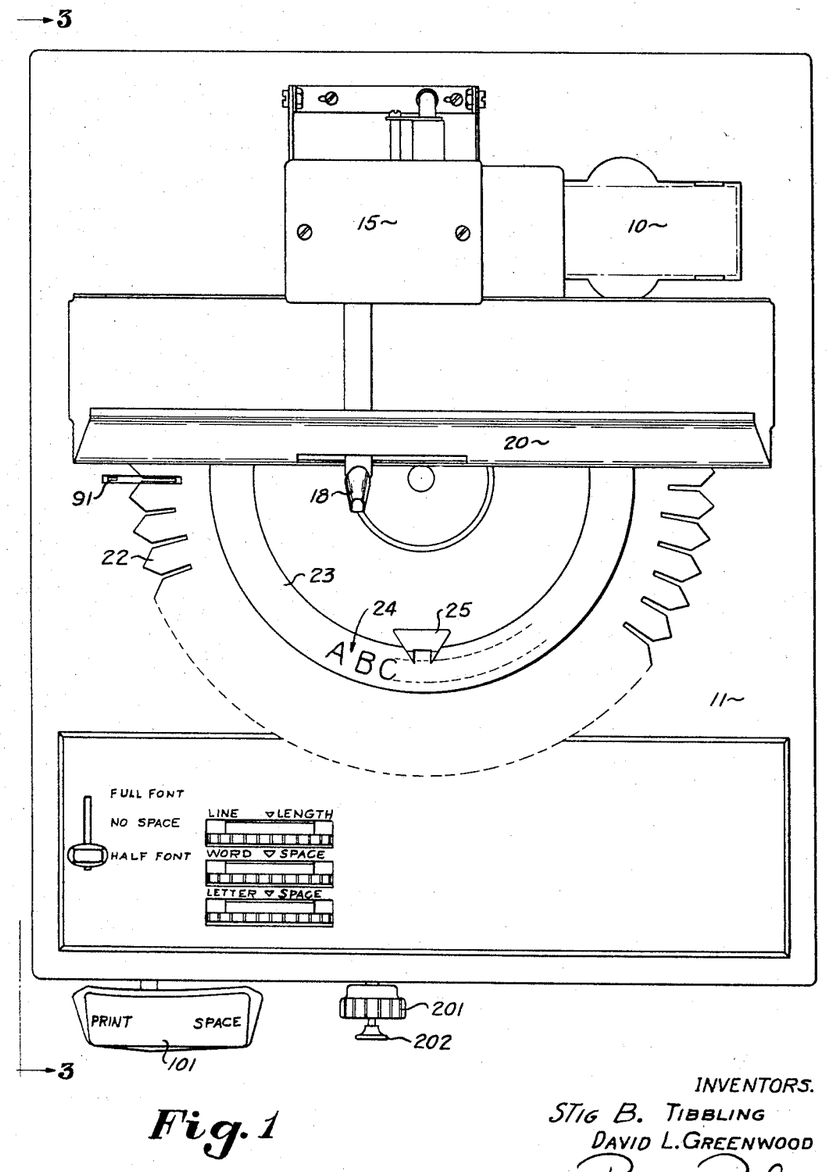
FIGURE 1 is a top plan view of a contact printing machine embodying the principles of this invention.
Figure 3:
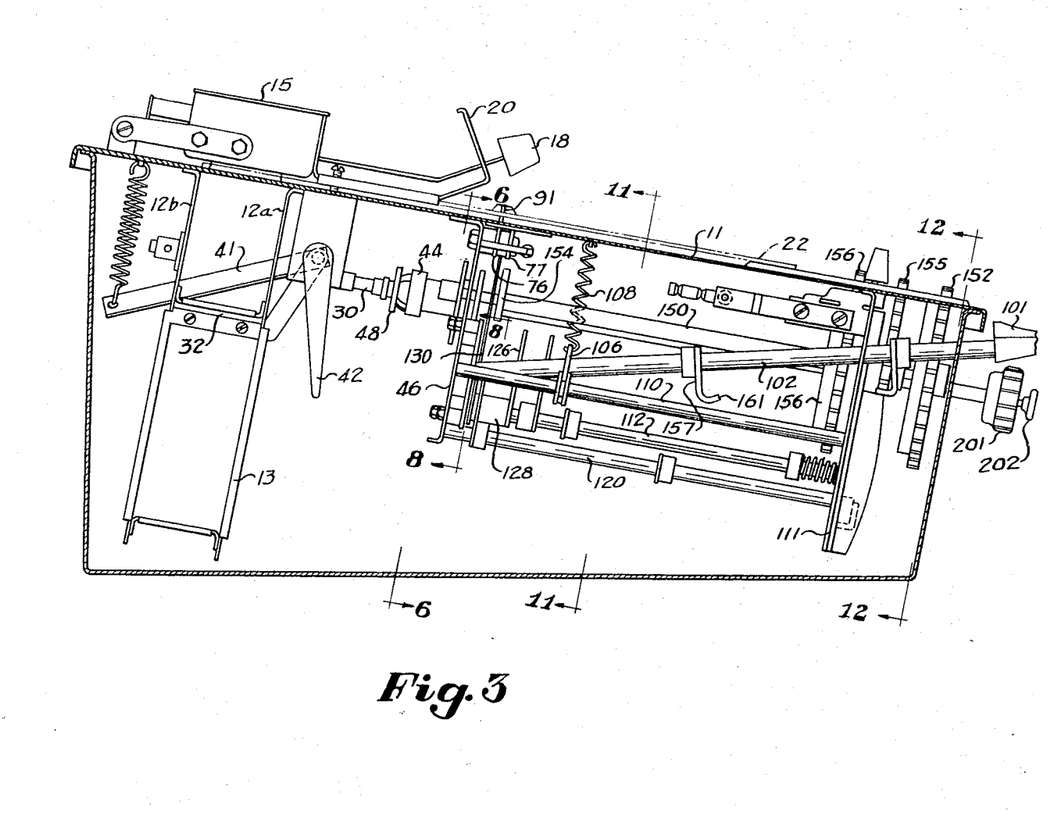
FIGURE 3 is a side elevation of the interior construction as viewed along line 3—3 of FIGURE 1.
Figure 5:
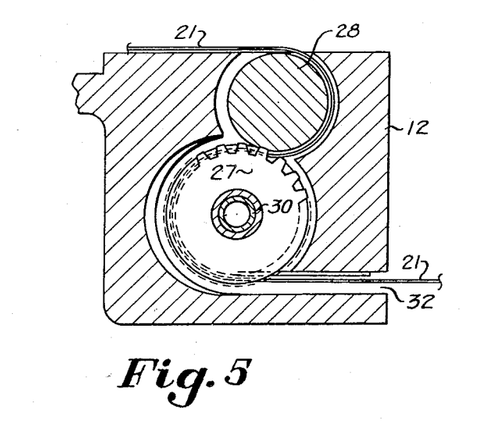
FIGURE 5 is a view of the sprocket feed drive as taken along line 5—5 of FIGURE 4.

In the machine as illustrated in FIGURE 1, a cartridge 10 containing a coil of sensitized photographic material, either paper or film, is held in a well with the top of the cartridge flush with the top surface 11 of the container. Surface 11 will hereinafter be referred to as a work-top surface. The film progresses along the work-top surface 11 for a short distance, and then extends downwardly into a sprocket housing 12. The location of housing 12 is seen in FIGURE 3, but the structure is best seen in FIGURE 5. Mechanism is employed in housing 12 to engage the exposed web and feed it into a receptacle box which is held by a retainer bracket 13. The receptacle box is not illustrated in the drawings in order to avoid confusion of parts in the illustration.

A lighthouse 15 contains an electric light bulb and an apertured opening controlled by a lever 18. The size of the aperture is controlled by moving the lever 18 laterally according to positions marked upon a panel 20.

The sensitized material, which is usually a web 21, having lateral perforations for engagement and registration with a sprocket gear drive, is fed under the lighthouse, and exposed by the lighthouse through the aperture, and collected in the lightproof receptacle box held by the bracket 13. Thus, if a shield having a transparent configuration opening is placed between the lighthouse 15 and the web, the web will be exposed according to the pattern of the shield. A self-positioning photo-typographical matrix disc 22 of transparent material having an opaque arcuate path 23 with configurations removed from the opaque areas, serves as a preferred type of shield. The disc 22 is thus prepared to act in the nature of a photographic negative. It will transmit light only through the areas intended, and thus act as a mask for printing out letters and symbols on the sensitized web. By rotation of the disc 22, the proper symbol is placed under the lighthouse aperture and the configuration of that area will be imposed upon the sensitized strip. In order to assist in placing the disc properly, a guide series 24 is printed on the disc surface and is positionable relative to a location station 25. This portion of the apparatus as briefly described, is prior art to the present invention, and a more full discussion of the exposure by means of the disc 22 will be found in U.S. Patent No. 2,742,830.

This invention deals with the novel manner of advancing the web 21. For proper exposure, the web must be advanced either one or two units of lineal measurement, according to the size font on the disc 22, or it may not be moved at all, in some instances, in order to double expose one position. Further, the units of measurement are variable for further control.

The sprocket housing 12 is enclosed in order to render it substantially light tight. As shown best in FIGURE 5, it contains a drive sprocket 27 rotatably supported upon a shaft 30. A roller 28, cooperating with a curved guide surface in the housing 12, accepts the web 21 and directs it down to the main drive sprocket 27. The web is pulled by rotation of the sprocket 27. The web is hand fed into the roller system within the sprocket housing 12, and this is caused to feed by positive drive, out through a slot 32 into the area of the retainer bracket 13 for storage in a receptacle box which is held by the bracket 13. This invention is centered considerably around the drive of the sprocket 27.

Figure 4:
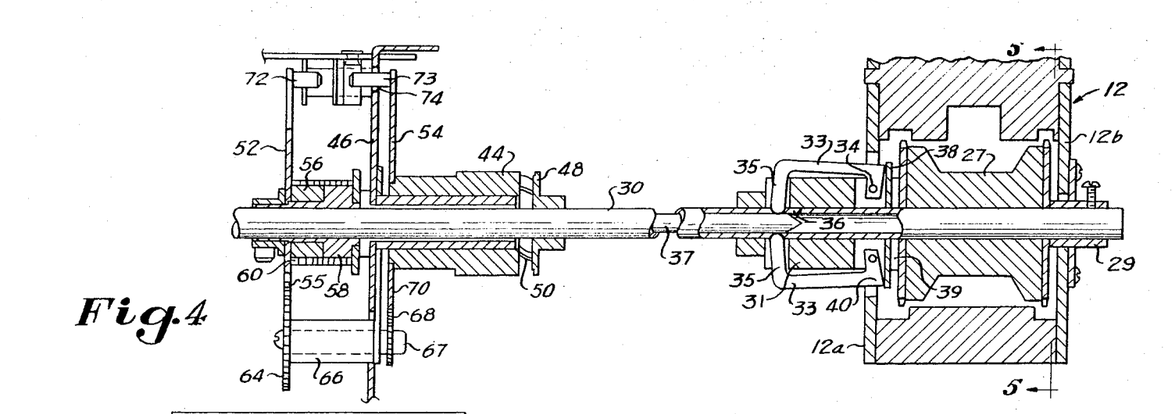
FIGURE 4 is an enlarged section taken along line 4—4 of FIGURE 2.

The sprocket construction and its driving apparatus may best be understood by reference largely to the FIGURE 4 of the drawings. Sprocket 27 is carried between side walls 12A and 12B of housing 12. The sprocket is journaled for free rotation upon the exterior of the shaft 30, and the shaft 30 is supported by a bearing 29 held by wall 12B.

A pivot block 31 is secured against endwise movement on shaft 30 by means of a lock collar. The pivot block 31 carries two substantially identical pivot arms 33 which are mounted to the block by means of pivot pins 34. The arms 33 carry cam follower ends 35. The shaft 30 is tubular and is slotted to provide openings 36 allowing the cam follower ends 35 to enter into the interior of the shaft 30 and substantially meet therein.

A rod 37 extends through the tube 30 and is pointed to act as a cam between the ends of the cam followers 35. Longitudinal movement of rod 37 will spread cam follower ends 35 and pivot the arms 33.

A pressure plate 38 and a friction disc 39 are positioned between the pivoted shoulder ends of the arms 33, and the surface of the sprocket 27. Hence, because the pivot pins 34 are inwardly spaced from the greatest radial position of the arms 33, shoulders 40 are created. Spreading of the cam follower ends 35 will cause the shoulders 40 to create a friction lock action between the pivot block 31 and the sprocket 27. This action is a familiar clutch arrangement which will cause the sprocket 27 to be driven or released according to whether the clutch is compressed or released.

Therefore, forward movement of the rod 37 will cause the sprocket 27 to rotate with the shaft 30, but return movement will release the cam follower ends 35, and the drive interconnection is cancelled. The sprocket 27 will be separately journaled as a free floating device on the shaft 30 when the clutch action is released. When the sprocket 27 is released, the web 21 may then be pulled out of the drive housing. A knife blade 41, shown in FIGURE 3, operated by handle 42, is employed to sever off any length desired of the web as it emerges through the slot 32.

In the operation of the sprocket 27, the shaft 30 must be advanced in one direction only, and prevented absolutely from any backlash or reverse movement until intentional release of the pivot arms 33. Anti-reverse is accomplished by means of a fixed stud 44 carried by a central wall 46, and a spring tooth check clutch 48. Clutch 48 has a plurality of spring teeth 50 canted at such an angle to the surface of stud 44 that an increase in the friction torque is obtained in the reverse direction as compared to the torque in the forward direction. This anti-reverse friction brake is substantially absolute in its anti-reversing action because the torque exerted on shaft 30 by the anti-reverse clutch is greater than the release torque of the spring clutch in the overriding direction. In some instances, printing on the web of photographic material requires precise placement of fine accent marks and other details, and the use of this illustrated backup device provides accurate results unfailingly.

Figure 11:
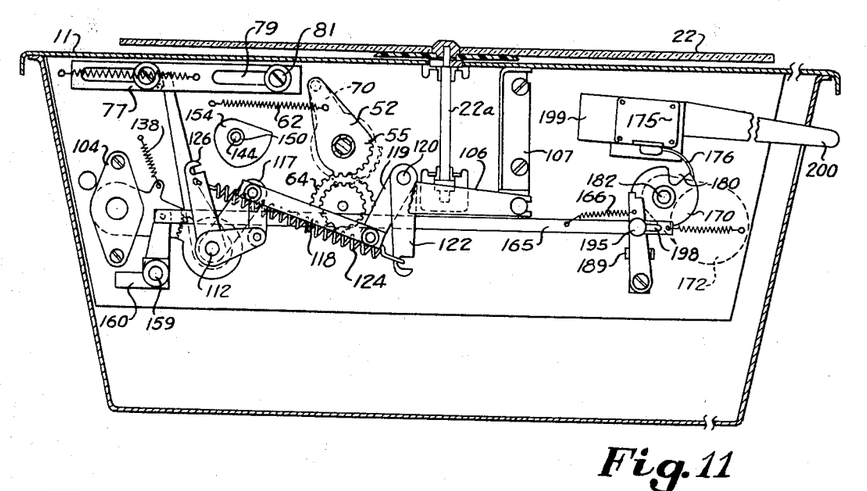
FIGURE 11 is a section taken along line 11—11 of FIGURE 3.

The essence of the forward drive of shaft 30 for drive of sprocket 27 is embodied in two crank assemblies 52 and 54, seen in FIGURE 4. The crank 52 is a segmental shaped lever as best shown in FIGURE 11. Crank 52 has a gear segment section 55 journaled by a collar 56 for free swing on shaft 30. See FIGURE 4. A mating collar 58 is fixed to the shaft 30 and, therefore, drives the shaft 30. A closely fitted coil spring 60 bridges between the collars 56 and 58, and by the known characteristic of such spring connections, will permit the crank 52 to move freely in one direction, but the opposite direction of crank movement will lock the spring 60 and cause a drive interconnection to the collar 58. The spring is attached to the cooperating members to cause a clockwise rotation of shaft 30 and the sprocket 27. A coil spring 62, illustrated in FIGURE 11, urges the crank 52 in a counterclockwise direction.

Figures 6, 9:
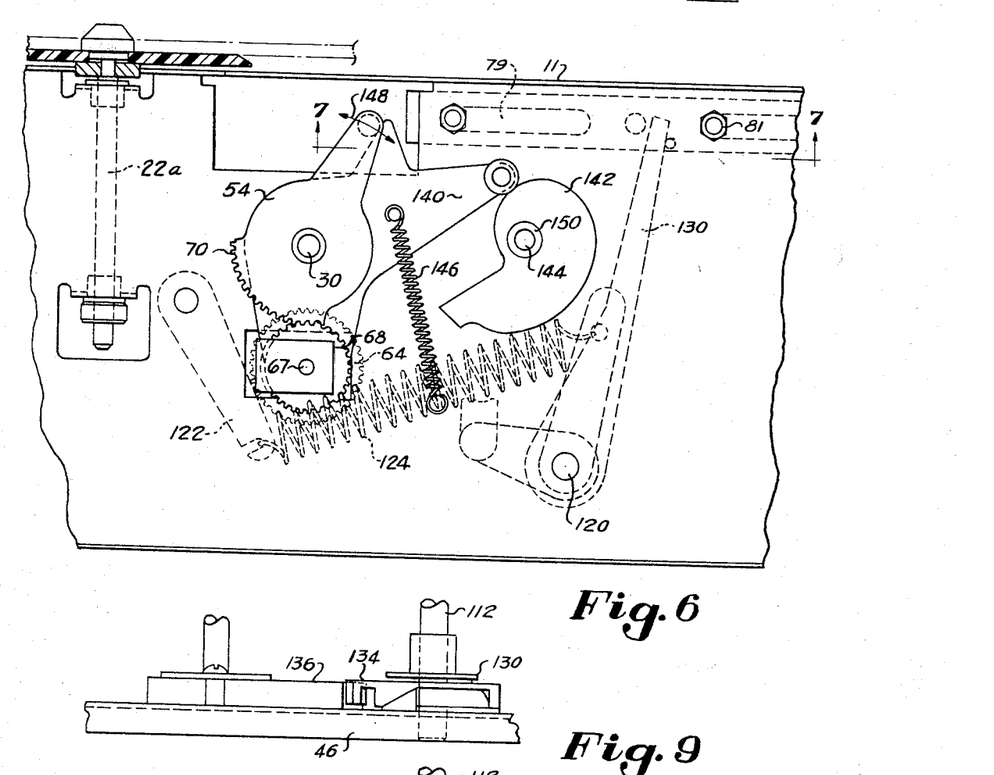
FIGURE 6 is a section view taken along line 6—6 of FIGURE 3.
FIGURE 9 is a bottom plan view as viewed along the line 9—9 of FIGURE 8.

Refer to FIGURES 6 and 11, together with FIGURE 4 to follow the cooperative action of the crank assemblies. The gear section 55 of crank 52 is engaged at all times with a gear 64. See both FIGURES 4 and 11. A spacer bearing 66 supports a shaft 67 which carries the gear 64 on the supporting wall 46, and transmits driving power to a gear 68 located on the opposite side of the wall 46. The crank 54 is journaled on the stud 44 and thus is pivotable around shaft 30. The crank 54 is provided with a gear segment section 70 as seen in phantom outline behind crank 52 in FIGURE 11. The cranks 52 and 54 carry similar abutment studs 72 and 73 respectively. Studs 72 and 73 approach one another but are spaced a considerable distance apart. An opening 74 in the wall 46 permits the abutment stud 73 to swing unobstructed and to project through to the side of the wall where it is accessible along with the stud 72.

The gear ratio through the segment 70, gear 68 and gear 64, to crank 52, is such that driving the abutment stud 73 will produce a rotational movement of the crank 52 which is exactly twice as great as a similar drive movement applied directly to the abutment stud 72. Hence, a given lateral movement applied to the stud 72 will cause a first degree of clockwise rotational movement of the shaft 30, but a similar lateral extent of movement applied to the stud 73 will cause twice that amount of rotation of shaft 30.

In essence, therefore, it is seen that the web is advanced by rotating a drive sprocket through a unidirectional rotatable shaft, and that shaft is driven by a first crank arm which functions as a ratchet directly to the shaft for a one-to-one translation of rotary crank movement to rotary shaft movement. That first crank is in turn driven by a second crank through a gear device which enables a two-to-one shaft movement for one increment of shaft movement.

It follows that drive of the shaft 30 by contact of the abutment stud 72 for a one-to-one ratio, or abutment stud 73 for a two-to-one ratio, is next to be considered. The principle employed by this invention is to provide one slide aligned to selectively abut the two abutment studs 72 or 73, and then to drive the slide by means of a yieldable driving device and to limit the amount of movement that the slide may travel in accordance with the needed web advancement. That is, by making provision for a full slide movement to advance each of the abutment studs to the maximum possible limit, and then interposing a stop device, a selected degree of shaft rotation can be achieved. The construction which is provided for this purpose is best seen in FIGURE 7, for detail, and may be seen in its relationship to the entire apparatus in FIGURE 2, and to some extent in the FIGURES 6 and 11.

Figure 7:
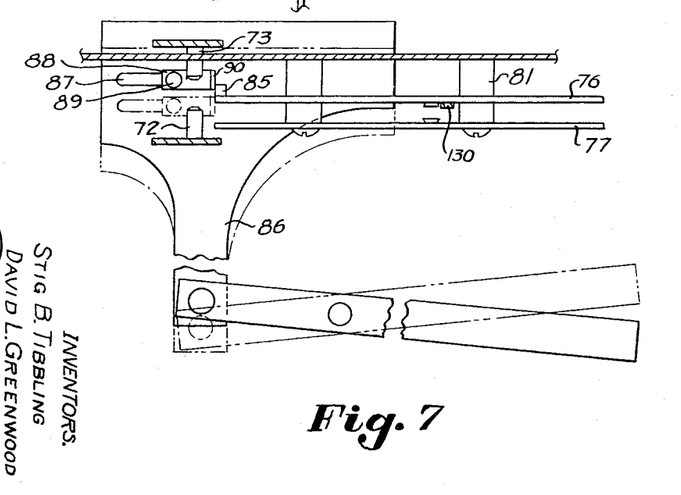
FIGURE 7 is a bottom plan view of the slide drives and shifting system as viewed along line 7—7 of FIGURE 6.

Referring to FIGURE 7, two slides 76 and 77, each of which are constructed with two longitudinally aligned slots 79 which may be seen in FIGURE 11, are mounted on support posts 81 carried by the wall 46. The slide 76 has a wide forward end 85, but this end is dimensioned to go between the two studs 72 and 73, and contact neither. The slide 77 is aligned to contact the abutment stud 72.

In order to select which of the studs 72 or 73 will be driven by the slide 76, a cross-slide carriage 86 is mounted to move in a path transverse to the paths of the slides 76 and 77. The carriage 86 has a longitudinal slot 87 which is oriented to extend in a direction parallel to the two slides 76 and 77 regardless of the longitudinal position of the carriage 86. An interposer slide 88 is carried on the carriage 86 by means of a slidable connector bolt 89. Slot 87 serves as a track for bolt 89. Interposer 88 is urged toward the release position of the abutment stud, as shown in FIGURE 7, by means of a spring which is not illustrated in the drawings.

The interposer 88 and carriage 86 are shown in full line position and in phantom outline, indicating the two relative positions of the carriage in maximum travel and the resultant position of the interposer 88.

The interposer 88 has an upwardly turned end wall 90 which extends from the surface of the carriage 86 to an elevation aligned with the abutment studs 72 and 73. However, it has a lateral dimension which will enable it to pass between the two studs. In this respect, the lateral dimension is substantially equal to the lateral dimension of wide forward end 85 on the slide 76.

When the carriage 86 is moved to the full line position as shown in FIGURE 7, then if the slide 76 is advanced, the wide end 85 will make abutment contact with one side of the front end wall 90 of interposer 88, and the wall 90 will bridge to contact the abutment stud 73 and translate force from the slide 76 to the stud 73. The interposer 88 is positioned to transmit power from the end 85 to the stud 73, which would otherwise not be possible because the two members 73 and 85 are not in alignment.

The carriage 86, in its second extreme position as shown in dotted outline, will place the interposers 88 between the abutment 72 and the end of slide 76 and transmit movement to the stud 72. Thus, by endwise shifting of the carriage 86, either the single one-to-one ratio stud 72 may be contacted and driven, or the movement may be doubled by moving to the full line position of FIGURE 7 to contact and drive stud 73.

There is a central position between the two extremes for the carriage 86, and in this central position, the interposer 88 will align itself with the wide forward end 85 on slide 76 and forward movement of the slide 76 will move the end wall 90 between the studs 72 and 73, thus providing no forward movement.

In contradistinction, endwise movement of the slide 77 will contact the abutment stud 72 and no other. The interposer 88 does not effect this slide movement and its drive of abutment stud 72. Hence, only a single degree of advancement is possible by operation of slide 72.

The reason for this separation of function is that the slide 76 carries on the end thereof an upwardly extending finger 91 which projects through the work-top surface 11, as best seen in FIGURE 1, for engagement with the notches on the periphery of the disc 22. Slide 77 is free of restriction by the disc.

This engagement by finger 91 is used to limit the forward movement of the slide 76, as dictated by the replaceable disc 22, and according to the depth of particular slot of the disc. In this sense, because various ones of the discs 22 are used, it is referred to as an exchangeable interference means. A double bearing supported spindle 22A is used to mount the various discs 22. Hence, the drive movement of the slide 76 is controlled with respect to its maximum extent of travel, by the operation of finger 91 cooperating with the notches of the disc 22.

The drive apparatus which is used to advance the slide 76 is also employed to cause apparatus to energize an exposure light in the lighthouse 15. The driving apparatus is arranged such that the lighthouse light is not activated during drive of the slide 77.

Figure 2:
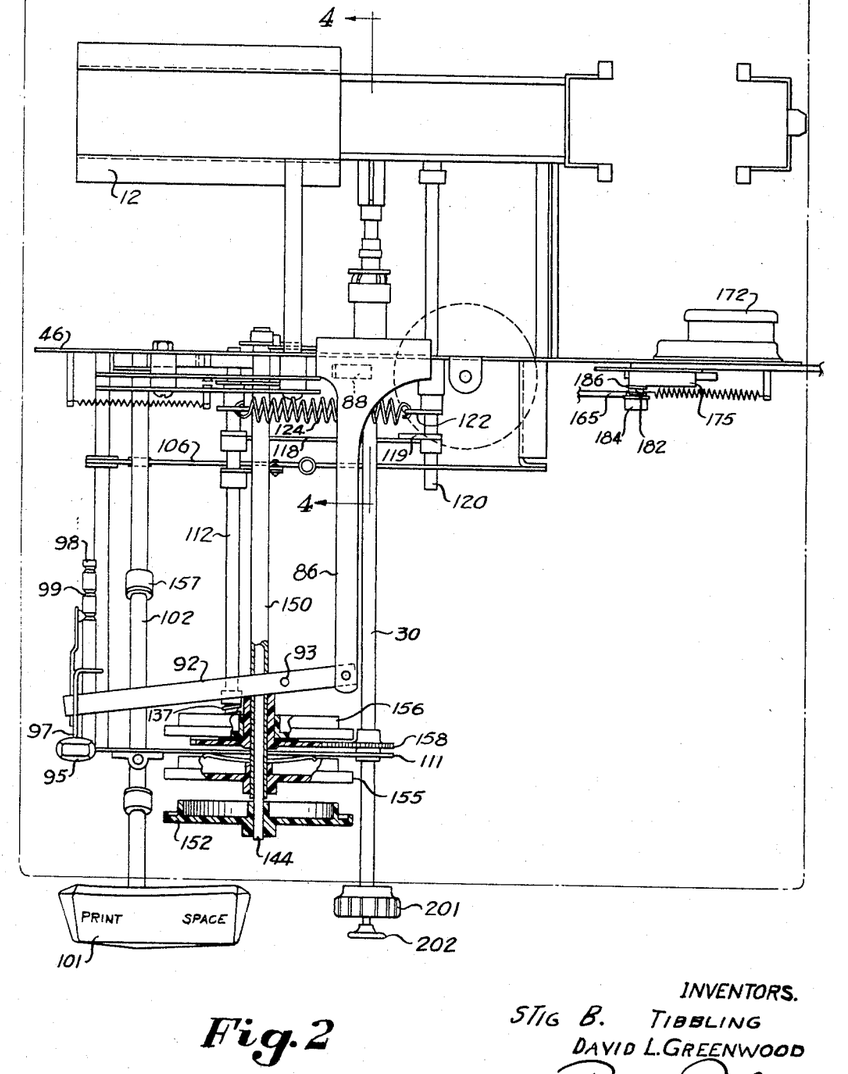
FIGURE 2 is a top plan view of the interior of the apparatus, with the top wall of the casing, and the lighthouse with its control removed.

In order that the operator may control the movement of the carriage 86 from the work-top surface 11, an arm 92, as seen in FIGURE 2, is carried by a pivot 93 and actuated by a handle 95 which projects above the surface 11.

Just under the location of handle 95, below surface 11, an arm 97 is carried by the handle 95 and adapted to engage as a detent arm into a detent rod 98. Rod 98 has three notches 99 representing the three positions of carriage 86 described. Hence, the operator can determine from the size and spacing on the particular disc 22 what advancement is desired. If the disc 22 has large type requiring extra space, the handle 95 is placed at the position mark "half font." This terminology indicates that the disc 22 carries only a limited number of characters. For example, it may carry only all capital letters, or all small case letters, but not both. The size of the printing in the path 23 dictates the number of characters that may be carried in path 23. Therefore, the disc 22 is only provided with half of a full font.

FIGURE 2 illustrates the relationship of parts such that in the half font position of handle 95, the carriage 86 positions the interposer 88 for interconnection between the slide 76 and the abutment stud 73. In comparing FIGURES 2 and 7, the action appears reversed because the direction of view is reversed. Drive of the slide 76 will contact the abutment stud 73 and produce a double unit of movement through the multiplying gear ratio. Thus, the greater amount of the web 21 is advanced.

If the disc employed carries a full font of both capitals and small case letters, then handle 95 is moved fully to the position shown in FIGURE 1 marked "full font." The spacing required in only half as much for each letter. Thus, the interposing end wall 90 is shifted to the dotted outline position shown in FIGURE 7 and advancement is only half of the distance necessary for half font disc.

The central position of "no space" is employed for such instances as languages in which accent marks are employed with a letter and, therefore, a letter must first be printed and then the accent or punctuation mark moved over the same position and another exposure made. The apparatus used to actuate the exposure control is also used to advance the slide 76, but no advancement of the web is desired.

Forward drive of the two slides 76 and 77 is obtained by manual operation of handle 101 seen projecting from the front of the machine in FIGURES 1, 2 and 3. Handle 101 operates a long swing shaft 102. Shaft 102 is pivotally mounted to the wall 46 by a pivot bracket 104. The form of bracket 104 may best be seen in FIGURES 8 and 11. Downward movement of the handle 101 will cause a downward swing of the shaft 102, and this downward swing is employed as a power take-off to operate several functions of the apparatus.

Figure 12:
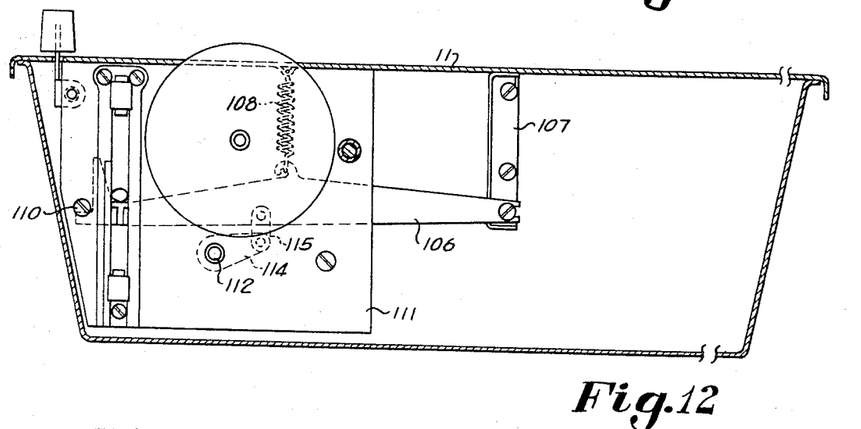
FIGURE 12 is a front elevation of the device, with the front wall removed, as viewed along line 12—12 of FIGURE 3.

The main power take-off for operation of the apparatus, seen best in FIGURE 12, is by means of a walking beam 106 carried at one end by bracket 107 and urged into a home position by spring 108. The spring 108 brings the end of the beam into a non-active rest position against a stop rod 110 which runs between a front support wall 111 and the central wall 46. The angular position of the rod 102 is best seen in FIGURE 3 where the spring 108 and the end of the beam 106 may also be seen.

See FIGURES 2 and 12. A shaft 112 is carried by walls 46 and 111. It will be seen that shaft 112 is rotated by downward movement of the beam 106 through the intermediate action of a crank arm 114 and a link 115. In order to obtain the yielding drive force necessary to allow an intervening structure to limit movement of the slides 76 and 77, drive force is taken from the shaft 112 to an auxiliary shaft, and that auxiliary shaft returns a resilient drive to an intermediary drive lever journaled on shaft 112.

The auxiliary structure is best seen in FIGURE 11. A link 117 carried by the shaft 112 operates two connecting links 118 and 119 which, in turn, drive a secondary shaft 120. Shaft 120 extends to a position under the table area which carries the web, adjacent to the sprocket housing 12, and there acts through a knuckle connection to provide a pressure pad under the web to press up against the bottom of the disc 22. The shaft 120 may be seen in FIGURE 2, but the pressure foot construction is not further illustrated, being a collateral, although necessary, function for good photographic procedures.

The shaft 120 carries a hook arm 122 which, in turn, pulls a spring 124. Spring 124 may be seen in FIGURE 2, extending under the carriage 86, parallel to the central wall 46. In FIGURE 11, springs 124 is seen extending upwardly and to the left where it is connected to a hook arm 126.

Refer to FIGURES 3, and 8 through 10. Arm 126 is part of a journaled actuator including a collar 128 journaled upon the shaft 112. Collar 128 carries the arm 126 on one end and a long finger lever 130 on the other. Lever 130 is the drive device which is employed to drive the slides 76 and 77 to the extent that separate intervening control devices permit. The lever 130 is driven by the shaft 112, but it is not directly mounted to the shaft for a one-to-one ratio of drive, because of the need of yieldable drive. Hence, the drive force of the rotating shaft 112 is transferred to the shaft 120, where the rotation of the shaft 120 is employed for the dual function of pressing the web tightly to the disc 22, but also operates the arm 122 which then translates back through arm 126 to the lever 130 in a yieldable drive.

Drive lever 130 is used to push the slides 76 and 77. There is only one drive lever 130 and there are two slides 76 and 77. The two slides are not actuated simultaneously. Rather, the shaft 112 is mounted in end bearings in walls 46 and 111 for longitudinal shifting, and the journaled collar 128 is carried along.

Figures 8, 10:
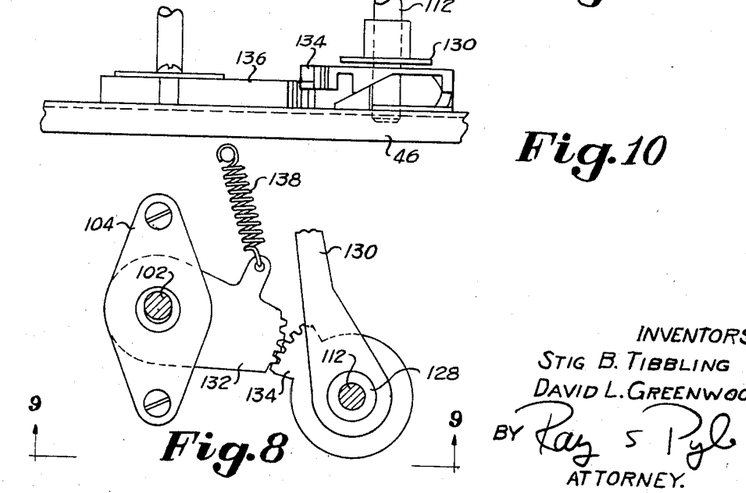
FIGURE 8 is an enlarged fragmentary portion as viewed along the line 8—8 of FIGURE 3.
FIGURE 10 is a view along the section illustrating FIGURE 9, with the parts actuated to a second position.

To accomplish such shifting of shaft 112, the end of the swing shaft 102 operated by handle 101, is carried in a gear segment 132 as shown best in FIGURE 8. Shaft 102 is pivotable with respect to the gear segment 132 to permit shaft 102 to swing in a vertical arcuate path. Shaft 102 is also rotatable around its own axis, but the gear segment 132 and swing shaft 102 are not rotatable with respect to one aonther. Therefore, rotation of the swing shaft 102 will give a rotational drive to the gear segment 132. Gear segment 132 in turn is meshed with and drives a gear segment 134 which is also journaled upon the shaft 112 along with the collar 128.

The back surface of the segment 134, as best seen in FIGURES 9 and 10, has a cam follower configuration, and a cam 136 is fixed to the wall 46. Thus, when the shaft 102 is rotated, the gear segment 134 is actuated from the position shown in FIGURE 9, wherein it is positioned close to the wall 46, to a position spaced from the wall as shown in FIGURE 10. Segment 134 is secured to the shaft 112 and hence urges the shaft longitudinally when the cams are actuated from the FIGURE 9 to the FIGURE 10 position. Refer to FIGURE 2, where it will be seen that a spring 137 is secured to the shaft 112 to abut the front wall 111 and urge the shaft 112 in a direction opposed to the cam movement action. Hence, return of the shaft 102 to a level position by means of a coil spring 138 (FIGURE 8) acting on segment 132 will cause a return of the cam to the FIGURE 9 position.

The long finger lever 130, which is carried by the collar 128, is therefore shifted longitudinally, as well as being driven in a rotary swing drive movement from the full line position to the dotted line position as shown in FIGURE 8.

Refer to FIGURE 7. The finger lever 130 is shown in its starting position. The drawings illustrate actuation movement in FIGURE 8. The lever 130 shown in section in FIGURE 7, will travel toward the abutment studs 72 and 73 whenever the shaft 102 is depressed to rotate the shaft 112 through the described linkage. However, by first rotating the shaft 102, the lever 130 is actuated along the shaft 112 until it abuts the inner surface of the slide 77, and thereafter depressing of the swing shaft 102 will cause a drive of the slide 77.

In FIGURE 1, the handle 101 is marked with the word "print" on the left hand side and the word "space" on the right hand side. The handle is proportioned such that pressure at either of these two locations on the handle will tend to rotate the shaft 102 in a left hand direction beyond the level position shown, and therefore pressure on that left hand portion of the handle will cause only a swing movement of the shaft 102 without prior rotation. This swing movement is translated into rotary movement of the shaft 112 and consequent actuation of the slide 76 through the lever 130. However, rotation of shaft 102 will operate the gear segment 132, and hence pressure at the right hand side of the handle 101 will cause the longitudinal shifting of the lever 130 as well as its drive for actuation of slide 77.

From the description thus far set forth, it has been shown that actuation of the handle 101 may be used to drive the two slide members and cause a controlled rotation of shaft 30. By the edge notch function of disc 22, the advance of slide 76 is arrested at any degree of advancement desired, even though the handle 101 is completely depressed for each operation, because of the resilient interconnection by means of spring 124. Thus, the notch formation of the disc 22 dictates the amount of advancement of slide 76 and hence the number of rotary degrees of motion which will be imparted to the crank assemblies 52 and 54. The number of rotary degrees may be selected as one or two units, but otherwise the advancement of the slide 76 will establish the amount of web material fed past the lighthouse exposure station.

The spacing between the letters is established according to the particular type of lettering on the disc 22. That is, the characters have an established point value and this value indicates the amount of spacing normally to be given between each character. If this amount of spacing is needed to be varied for the purpose of producing special effects, provision is made in this invention for changing the attitude of the crank assemblies 52 and 54.

Refer to FIGURE 6. The assembly of the two crank arms and the interconnecting gear segments 64 and 68 is carried on a cam follower carriage plate 140. A cam 142 is carried by a shaft 144 rotatable in order to move carriage 140 against the urge of a spring 146 to a selectable degree of rotation within the limits of cam 142. Movement of the carriage 140 in this manner causes the position of the abutment studs 72 and 73 to swing through a path indicated by the double ended arrow 148.

Slides 76 and 77, which drive the studs 72 and 73, have a fixed path of travel. Assuming they are free to travel the maximum possible distance, it will then be appreciated that the attitude of the abutment studs 72 and 73 will determine the total rotary degrees of motion imparted to shaft 30. If the abutment studs are positioned the maximum distance toward the slides, contact will be made immediately upon the beginning of slide movement and cause the crack assemblies to rotate a maximum amount. On the other hand, if they are placed a maximum distance away from the slides, the slide movement is partly exhausted before the abutment studs are contacted, and therefore a lesser amount of rotary movement is imparted to the shaft 30.

The shaft 144 is a rod extending within a tube shaft 150. In FIGURE 6, the view is from the side of wall 46 opposite the position of the front of the machine. At the front, as seen best in FIGURE 2, a control wheel 152 is mounted on the shaft 144 to drive the cam 142. The configuration of the cam 142 is such that the carriage 140 is set at a normal position somewhere between the maximum and minimum positions of the arrow path 148. Then, if a greater or lesser amount than the usual spacing is desired, the wheel 152 is moved clockwise or counterclockwise the desired amount. A scale is conveniently marked on the surface of the wheel 152, but is not illustrated in the drawings.

As indicated, the slide 77 is employed as the space actuator to drive the abutment stud 72 to space the web whenever a spacing other than established by cam 142 acting through slide 76 is needed, such for example as spacing between words. In order to establish the proper spacing, through slide 77, a rotary abutment 154, seen best in FIGURES 3 and 11, which has the appearance of a plate cam, is carried by the tube shaft 150 in alignment with the position of the plane of swing of the lever 130 when actuated to contact the catch stud 83 on the slide 77. Abutment 154 is not aligned with lever 130 in the drawings because the drawings illustrate the non-actuated condition of the machine. The rotary position of the abutment 154 controls the degree of freedom to swing for the lever 130 when actuated to the alignment position with stud 83 on slide 77.

A wheel 155 located together with wheel 152 at the forward position of the machine, will rotate the tubular shaft 150 to position the abutment 154. Wheel 155 is formed to carry marking on the periphery edge to indicate the particular point size type and thus indicate the relative rotation of the abutment device 154. This information is usually carried on the face of the disc 22 and the operator places the point size abutment 154 according to predetermined information thus given. If it is determined by the operator that a greater or lesser amount that this pre-established spacing is desirable, it may be arbitrarily provided rather than that which is established from the information given. However, if a line of printing on a web needs to be extended or retracted to fit a particular space, an operation referred to as justifying copy, this is usually done by changing the attitude of the abutment studs 72 and 73, rather than by changing the point setting effecting the space between words. Hence, after a series of letters or characters have been printed out, the space side of the handle 101 may be actuated to drive the slide 77 to the extent that the placement of the abutment 154 has provided. Thus, a different spacing between letters and between words may be established.

A third wheel, indicated as dial 156, is located with the function setting wheels 152 and 155. The dial 156 is freely journaled on the exterior surface of the shaft 150, and is driven by means of a gear reduction system 158 from the rotary shaft 30. In this manner, the dial 156 serves to record the total amount of the web 21 which has been exposed and passed through the lighthouse.

This invention also provides for exposure light and time of exposure without an extra operation. The shaft 102 driven by handle 101 carries an actuator collar 157. See FIGURES 2 and 3 for the location of actuator 157 on the shaft 102. Refer then to FIGURE 11, wherein the end of shaft 159 is shown in a position below and slightly offset from the path of swing of shaft 102. A tab 160 is shown in FIGURE 11, although it is technically not a proper part of the section FIGURE 11. Tab 160 is secured to shaft 159 and is positioned to receive abutment contact by the collar 157 only when a stem 161 (see FIGURE 3) thereof is positioned in the normal non-rotative position of shaft 102. That is, rotation of shaft 102 will rotate the stem 161 to a non-contact position with respect to the tab 160 and fail to transmit driving force. Hence, transmission of force upon actuation swing of swing shaft 102 is accomplished only when the shaft 102 is in the "print" position of handle 101 causing the lever 130 to actuate slide 76.

The rotation of shaft 159 operates through a link 162 to pull a rod 165. A spring 166 urges the rod 165 to a normal non-actuated position.

Figure 13:
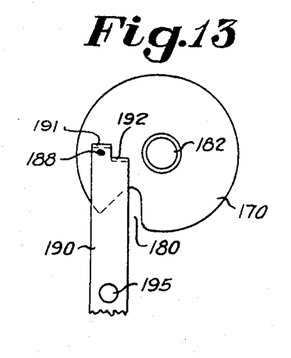
FIGURE 13 is an enlarged detail of a timing wheel and control.
Figure 14:
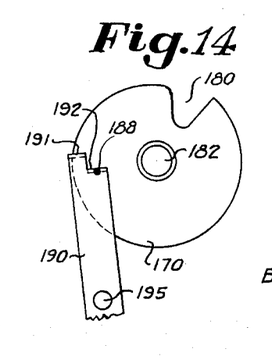
FIGURE 14 is a view of the timing wheel and control in a second operative position.

A rotary cam 170 is driven at a uniform rate by a motor 172. The location of the motor and cam may best be determined by comparison of FIGURES 2 and 11. See also FIGURES 13 and 14. Adjacent to cam 170, there is a normally open switch 175 which has a switch actuator 176. Actuator 176 drops into a timing recess 180 of cam 170 for actuation. The cam 170 is urged into driving rotation by the continuously rotating shaft 182 of the motor 172. A cap 184 on the end of the shaft presses against the surface of cam 170 through a spring 186. This construction provides a simplified slip clutch arrangement enabling the motor 172 to run continuously, applying a constant amplitude of rotary drive without need for starting and stopping of a driving motor.

A pin 188 is the key to release of the cam 170 for timed rotation. A lever stop arm 190 is employed as a stop and release mechanism to control cam rotation through the pin 188. Lever stop arm 190 has a first hook end 191, and a second hook end 192 longitudinally spaced from the first end 191. These ends 191 and 192 are able to grasp and hold the pin 188 to stop rotation of the cam 170. Lever stop arm 190 is urged to rotate around a supporting pin 195, but the lever is unable to move farther than the allowable distance established by protrusions 189 which form a limit stop for the arm 190. A longitudinal slot 198 in rod 165 permits rod 165 to travel to the left in FIGURE 11 after the lever stop arm 190 is stopped against the protrusion 189 of the stop member. Therefore, the lever stop arm 190 has a swing path of travel between the two positions illustrated in the FIGURES 13 and 14. When the rod 165 is actuated, the lever stop arm 190 will move to the position shown in FIGURE 14 wherein the hook end 192 is in the annular path of rotation of the pin 188. Hence, it will contact and stop the pin 188 when the pin rotates with cam 170 into contact position.

The hook ends 191 and 192 are alternately positioned in the path of pin 188. Upon actuation of the rod 165, the lever 190 is pulled to the left and the pin is released from its retention by the end 191. This has the effect of the pin 188 moving out between the step positions of the two ends 191 and 192. Such action, however, places the hook end 192 in the path of rotation of the pin, and upon completing its rotation, the pin will then abut the bottom surface of the end 192. Upon release of the handle 101, the lever 190 will return to the FIGURE 13 position, whereupon the cam 170 can advance slightly as the pin 188 is released from the bottom surface of hook end 192 and caused to abut the bottom surface of end 191. In this manner, a pivotally mounted rod working in response to actuation of the handle 101 will permit one timing revolution of the cam 170 in a positive and dependable manner without use of expensive latch mechanisms requiring service and maintenance. The solid lever 190 with its solid end surfaces will prohibit unwarranted rotation of the timing device in a positive manner.

Although the invention has been shown and described as employing one timing recess 180, and employing one complete revolution per timing action, it is within the concepts of this invention that a plurality of such recesses may be employed in order to alter the time of switch actuation, or to employ different types of switches. Speed of rotation will also be a determining factor in the number of recesses desired.

The configuration of the recesses 180 is such that a predetermined amount of closed time for the switch 175 is obtained for each excursion of the cam 170. However, the attitude of switch 175 and its actuator 176 with respect to the recess 180 may be changed to alter the actual period of switch closing time. Accordingly, the switch 175 is mounted upon a pivotable carriage 199 which is in turn driven to a selected position by a handle 200. Thus, the operator can adjust the time of lighthouse operation as experience and needs dictate.

Whenever the web 21 is first threaded through the sprocket housing 12, it is manually fed by rotating the external tubular portion of shaft 30 by means of a manual knob 201. Because the interconnection by spring 60 from the crank 52 is unidirectional in function, such manual operation is an overrunning of the clutch.

The rod 37, used for actuating the clutch to drive the sprocket 27, is slidably operable within a shaft 30 by means of a knob 202.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. In a photocomposing machine having an exposure station with a device for advancing a photosensitive web through said station, the provision of a drive and operating system for advancing said web in discrete increments comprising:

a primary drive having an established reciprocable drive amplitude motion;

drive train means including a yieldable link for transmission of drive motion from said drive to said device; and     separable attachment drive limiting means for stopping said drive train means subsequent to said yieldable link in said transmission of drive motion at any one of a plurality of selected positions less than full possible drive of said web, said drive train means including an interference device subsequent to said yieldable link movable in an established path under urge of said yieldable link, means for mounting said separable attachment in a position in said path, said separable attachment having a size configuration to interfere with the advance of said interference device at a predetermined place in the advance drive thereof, whereby said primary drive operates through a uniform full stroke and a selected resultant motion is transmitted to said device.

2. A photocomposing machine as defined in claim 1, further characterized in that:

said drive train means includes a reciprocable slide driven by said yieldable link between first and second maximum limits, said slide carrying an advance measuring probe;

said drive limiting means employing a unitary type font comprising a rigid circular disc having a central aperture to receive a spindle, and an opaque annular band on said disc with a set of transparent characters penetrating said band, a set of uniformly spaced open end radial slots in the circumference of said disc, one slot for each character in said set, each slot having a depth proportional to the width of its associated character, the closed end of each slot constituting a stop to limit the position of said advance measuring probe carried by said reciprocable slide; and spindle means for mounting said disc in a plane wherein said probe operates along a radius of said disc across the peripherial edge of said disc, whereby, full operation of the primary drive causes the said probe to enter the positioned slot in the disc, and bring the forward motion of the slide to a halt, whereas the yieldable link of said drive train permits said primary drive to continue its full drive amplitude.

3. A photocomposing machine as defined in claim 1, further characterized in that:

said drive train means includes a reciprocable slide driven by said yieldable link between first and second maximum limits;

a rotatable drive shaft connected to drive said device;

a first swingable arm, a unidirectional clutch means acting between said arm and said shaft for translating swing motion of said arm into drive shaft rotation;

a second swingable arm, means interconnecting said first and second arms to drive said first arm by said second arm in a related ratio, whereby actuation of said first arm will produce a first extent of shaft rotation and a like actuation of the second arm will produce a second extent of shaft rotation; and selector means for causing said slide to act upon one or the other of said arms.

4. A photocomposing machine as defined in claim 3, further characterized in that:

said reciprocable slide has an advance measuring probe;

said drive limiting means employing a unitary type font comprising a rigid circular disc having a central aperture to receive a spindle, and an opaque annular band on said disc with a set of transparent characters penetrating said band, a set of uniformly spaced open end radial slots in the circumference of said disc, one slot for each character in said set, each slot having a depth proportional to the width of its associated character, the closed end of each slot constituting a stop to limit the position of said advance measuring probe carried by said reciprocable slide; and spindle means for mounting said disc in a plane wherein said probe operates along a radius of said disc across the peripherial edge of said disc;

whereby the spacing established by said disc may advance the device in single or double units of distance.

5. A photocomposing machine having an exposer station with a device for advancing a photosensitive web through said station, as defined in claim 1, further characterized in that:

said drive limiting means embodying a unitary type font comprising a rigid circular disc having a central aperture to receive a spindle, and an opaque annular band on said disc with a set of transparent characters penetrating said band, a set of uniformly spaced open end radial slots in the circumference of said disc, one slot for each character in said set, each slot having a depth proportional to the width of its associated character, the closed end of each slot constituting a stop to limit the position of a film feed measuring probe carried by said reciprocable slide;

a second reciprocable slide free of said disc, and having a variable stop positioned manually to limit the second reciprocable slide to a selected drive amplitude position; and transmission means under manual control of said primary drive lever for selectably driving either said first or second reciprocable slide, whereby, said web may be advanced through a series of exposures using said disc as an advance gauge, whereafter the transmission may be shifted to drive said second slide for independent advancement of a web free of disc control.

6. In a photocomposing machine having an exposer station with a device for advancing a photosensitive web through said station, the provision of a drive and operating system for advancing said web in discrete increments comprising:

a primary drive rod shaft pivoted at one end and swingable about said pivot in a reciprocable drive path between first and second limits;

a rotatable drive shaft connected to drive said device;

a first swingable arm, a unidirectional clutch means acting between said arm and said shaft for translating swing motion of said arm into drive shaft rotation;

a second swingable arm, means interconnecting said first and second arms to drive said first arm by said second arm in a related ratio, whereby actuation of said first arm will produce a first extent of shaft rotation and a like actuation of the second arm will produce a second extent of shaft rotation;

said first and second swingable arms operating in laterally spaced adjacent planes;

a first slide operable in a path passing between said first and second swingable arms;

a selector means shiftable laterally with respect to said first slide to bridge between said first arm and said first slide in a first selector means position, and to bridge between said first slide and second swingable arm in a second selector means position, said selector means having a neutral position enabling said first slide to move with no effect upon either swingable arm;

a second reciprocable slide aligned to abut only said first swingable arm;

a drive train means including a yieldable link for transmission of drive motion from said primary drive shaft to a selected one of said first and second slides;

shiftable transmission means operable by rotary motion of said primary drive shaft for selecting the application of drive transmission to said first or second slide;

exchangeable interference means for limiting drive motion of said first slide and adjustable interference means for limiting the drive motion of said second slide; and lighthouse means in said exposer station operable only upon actuation of said first slide.

7. A photocomposing machine as defined in claim 1, further characterized in that:

said primary drive is a swingable lever which is also rotatable about its own axis;

said drive limiting means is a rigid circular disc having an opaque annular band with transparent characters positioned to pass through said exposer station;

said drive train means includes a first rotary position of said primary drive lever for actuating said drive transmission subject to control of said drive limiting disc, and having a second rotary position of said lever for actuating said drive transmission means free of said drive limiting disc;

a lighthouse in said exposer station and a switch in control of said lighthouse; and said primary drive lever having a switch actuator positioned to contact said switch in the rotary position wherein the drive means is subject to said limiting disc, and positioned for non-actuation of said switch in a rotated position wherein the drive transmission is free of said limiting means disc.

References Cited

UNITED STATES PATENTS

| | | | |
|---|---|---|---|
| 2,099,681 | 11/1937 | Draeger | 95—31 |
| 2,496,329 | 2/1950 | Briechle | 95—31 |
| 2,887,936 | 5/1959 | Spievak | 95—4.5 |
| 3,073,229 | 1/1963 | Madge | 95—31 |

JOHN M. HORAN, *Primary Examiner.*

U.S. Cl. X.R.

95—31